United States Patent [19]

Gray et al.

[11] Patent Number: 5,044,827
[45] Date of Patent: Sep. 3, 1991

[54] METHOD FOR RECOVERING WET BUCKLED PIPE

[75] Inventors: David A. Gray, Cypress, Tex.; Walter E. Gray, Jr., Santa Barbara, Calif.; Charles R. Yemington, Houston, Tex.

[73] Assignee: Diverless Systems, Inc., Carpinteria, Calif.

[21] Appl. No.: 605,642

[22] Filed: Oct. 30, 1990

[51] Int. Cl.⁵ ............................................. F16L 1/16
[52] U.S. Cl. .................................. 405/173; 405/158
[58] Field of Search ............... 405/154, 156, 158, 162, 405/166, 168, 169, 171, 173

[56] References Cited

U.S. PATENT DOCUMENTS

| | | | |
|---|---|---|---|
| 3,309,879 | 3/1967 | Miller | 405/173 X |
| 3,656,309 | 4/1972 | Bultema | 405/171 X |
| 4,234,268 | 11/1980 | Scodino | 405/158 |
| 4,444,528 | 4/1984 | Scodino et al. | 405/173 |
| 4,445,804 | 5/1984 | Abdallah et al. | 405/173 |

*Primary Examiner*—David H. Corbin
*Attorney, Agent, or Firm*—Pravel, Gambrell, Hewitt, Kimball & Krieger

[57] ABSTRACT

A method for severing and recovering a submerged pipeline is disclosed. The severing and recovering operation may be performed with divers or with a remotely operated vehicle. The deflated lift bag is lowered to the submerged pipeline. The deflated lift bag is positioned under the submerged pipeline and then inflated until a section of the pipeline has been raised off of the sea floor. A cutoff saw is next lowered to the raised section of the pipeline. The cutoff saw is clamped to the pipeline prior to severing the pipeline. The cutoff saw is then removed from the severed pipeline. A recovery head is lowered to the raised end of the severed pipeline. The recovery head is aligned and placed in the raised end of the severed pipeline. The recovery head is activated to establish a gripping relationship with the pipeline. A recovery cable is lowered and connected to the recovery head. The recovery cable is retrieved to recover the recovery head and the pipeline to the water surface.

19 Claims, 7 Drawing Sheets

METHOD FOR RECOVERING WET BUCKLED PIPE

BACKGROUND OF THE INVENTION

1. Field of the Invention

The present invention relates to a method of retrieving a submerged pipeline. More particularly, the invention relates to a method to remotely sever a damaged submerged pipeline and to retrieve the severed ends of the pipeline to the water surface.

2. Description of the Related Art

Marine pipelines are typically laid on the sea floor from floating vessels called lay barges. To install a submerged pipeline, joints of pipe are welded together on the lay barge. The end of the first joint of pipe is sealed to prevent water from filling the pipeline as the pipeline is laid. As the joints of pipe are welded together into a continuous length of pipeline, the lay barge is moved forward in the water and the welded pipeline slides on pipeline rollers on the lay barge, then over a stinger which is attached to the stern of the lay barge and into the water. As the pipeline leaves the lay barge and the stinger, it bends under its own weight and assumes a generally S-shaped configuration between the stern of the lay barge and the sea floor. The stinger is an extended support which limits the bending of the pipeline between the lay barge and the sea floor, thus reducing the potential of the pipeline buckling as it is being laid. Pipeline tensioners on the deck of the lay barge grip the pipeline and further reduce the bending of the pipeline as it is being laid.

During pipe lay operations of the pipeline, loss of tension in the pipeline due to adverse weather or to failure of the tensioners can cause the pipeline to bend excessively. Excessive bending of the pipeline may cause the pipeline to buckle. If the buckle results in water entering the pipeline it is referred to as a "wet buckle." The submerged pipeline will fill with water, with the pipeline breaking at a location, generally near the stinger, and fall to the sea floor. A pipeline can also be damaged after the pipeline has been laid, for example, by ships dragging their anchors over the pipeline.

Normally, to repair a submerged pipeline which has buckled and broken or has been damaged, the broken or damaged end of the pipeline needs to be lifted to the water surface so that the pipeline can be repaired. Various techniques have been used to raise a submerged pipeline end to the water surface. The depth of the water typically determines whether or not the pipeline end will be recovered using divers or diverless vehicles. Conventional pipeline recovery operations using divers are restricted to maximum depths of about 300 meters. The conventional pipeline recovery technique uses divers to cut the pipeline at the sea floor. The divers then either weld a retrieval line to the severed end of the pipeline or connect a lift head to the pipeline end to raise the pipeline end to the water surface. Lift heads are well known in the art as a means for gripping a pipeline end. The retrieval cable is drawn in by a winch on the lay barge to raise the pipeline end to the water surface. As the pipeline end is raised to the water surface, the section of pipeline raised above the sea floor will bend by its own weight, in the shape of a catenary between the sea floor and the water surface. The pipeline, if filled with water during retrieval of the pipeline to the water surface, is heavy and more likely to buckle than is a lighter pipeline. The pipeline can be lightened by eliminating the water or de-watering the pipeline. A fluid displacing pipeline pig is frequently used to de-water the section of pipeline being raised above the sea floor. Pipeline pigs are typically propelled through a pipeline by injecting a pressurized gas behind the pig.

In deep water, water depths exceeding 300 meters, various techniques have been developed to recover damaged pipelines without sending divers down to the damaged pipeline on the sea floor. A typical recovery method for deep water utilizes a remotely operated vehicle (ROV) which is controlled by operators from a vessel on the water surface. The ROV can manipulate cutting equipment to sever a damaged pipeline. The ROV then inserts a lift head into the open end of the pipeline section which will be raised to the water surface. A retrieval cable attached to the lift head is drawn in by a winch on the lay barge to raise the pipeline end.

Another technique for recovery of a submerged pipeline utilizes a repair frame to grip the submerged pipeline. The repair frame may have cutting equipment to sever the pipeline and a lift head to grip the pipeline attached to the repair frame. In water depths up to 200 meters, divers can operate the repair frame from a control panel located on the repair frame. At depths beyond the reach of divers, a ROV can operate the repair frame from the control panel.

U.S. Pat. No. 4,445,804 to Abdallah et al. discloses a method and apparatus for the remote recovery of submerged pipelines by utilizing a buoy in combination with cables controlled from the lay vessel to deploy equipment to a submerged pipeline. In the '804 patent, a pipe alignment frame is lowered and located in an operational relationship with the submerged pipeline with the aid of a ROV. The pipeline is lifted off the sea floor by an arm of the pipe alignment frame which scoops the pipe up and lifts it. Cutting equipment is then lowered via the cables and stabbed into the pipe alignment frame. The cutting equipment severs the pipeline and is then raised to the lay vessel via the cables. A lift head is lowered via the cables and is stabbed over the end of the pipeline. After the lift head has been actuated to grip the pipeline, the cable is taken in to recover the pipeline to the water surface.

As the offshore oil industry continues to venture into deeper and deeper waters, more and more pipelines are being laid in water depths beyond the range of divers. Due to a variety of factors such as pipeline size, sea floor bearing capacity, sea currents, and lay barge daily rates, a reliable and dependable method for retrieving pipelines either with or without the aid of divers is needed. The method should minimize the amount of handling of the recovered end of the pipeline as it is raised off the sea floor so that the retrieved end can be directly pulled onto the stinger and into the grasp of the pipeline tensioners. Furthermore, the method of retrieving pipelines should minimize cost and minimize dependency on motions of the vessel due to sea conditions, such as heave, roll or pitch, which can result in a significant amount of standby time and cost.

SUMMARY OF THE INVENTION

The present invention relates to a method of recovering wet buckled pipe from the sea floor in any depth of water. The method consists of dredging a trench under an appropriate location of the buckled pipeline. Lift bags are then positioned under the pipeline. The lift bags are inflated with water until the pipeline is raised to a sufficient height above the sea bottom. A cutoff saw is deployed from the water surface and mated with the buckled pipeline at the sea floor. The pipe is severed by the cutoff saw and a recovery head is mounted to the end of the pipe. A pipeline pig is launched from the other end of the pipe so that the pipe is de-watered. A cable from the lay barge is lowered and connected to the recovery head. The pipe is then retrieved to the water surface using the cable from the lay barge. The entire method may be accomplished from a support vessel with the exception of retrieving the pipe to the surface, which is accomplished by a lay barge.

BRIEF DESCRIPTION OF THE DRAWINGS

A better understanding of the present invention may be had by reference to the following drawings and contained numerals therein of which.

DETAILED DESCRIPTION OF THE PREFERRED EMBODIMENT

The present invention relates to a method of recovering wet buckled pipe from the sea floor in any depth of water. It is to be understood that the method can be used with divers or with remotely operated vehicles (ROV's); however, the following description describe the steps involved in recovering a pipeline in deep water with a ROV due to the increased difficulties associated with a deep water recovery.

Figure 1:
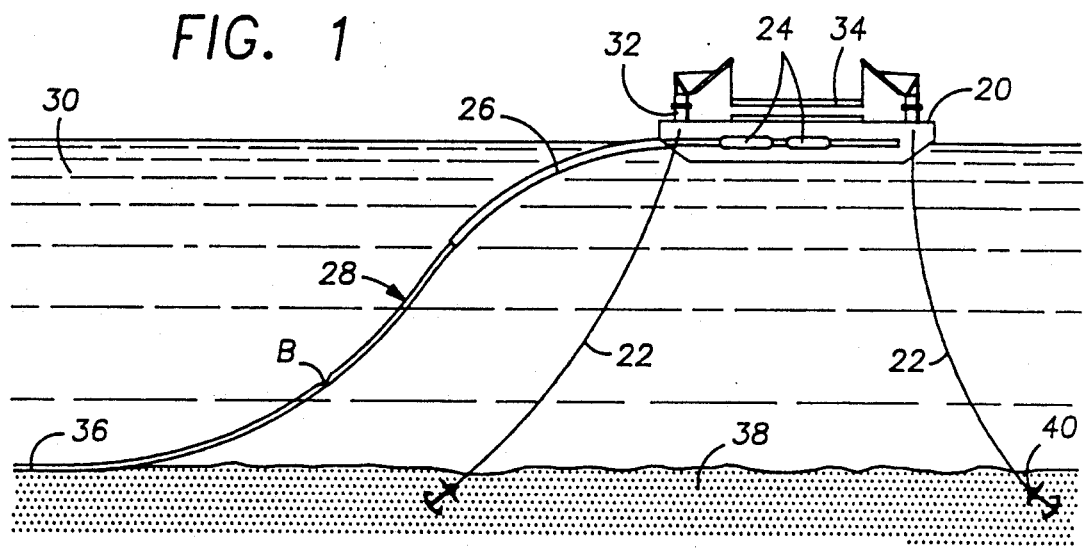
FIG. 1 is a diagrammatic view illustrating a pipeline buckle occurring as a pipeline is lowered from a lay barge.

FIG. 1 illustrates the basic elements of the pipe laying system which include a lay barge 20, a mooring system 22 or suitable dynamic positioning system, pipeline tensioners 24, a stinger 26 and the suspended pipe span 28. The lay barge 20 is shown floating in a body of water 30. The lay barge 20 utilizes derrick or similar crane means 32 to perform heavy lifting operations. Joints of pipe 34 on board the lay barge 20 are placed on a welding ramp (not shown) and are welded into a continuous pipeline 36. The pipeline 36 is held in tension between the sea floor 38 and the lay barge 20 by pipeline tensioners 24 as the pipeline 36 is lowered. This procedure for tensioned pipeline construction is well known in the art. As the lay barge 20 moves forward by pulling on the mooring system 22 off the bow of the lay barge 20, the pipeline 36 is lowered from the lay barge 20 over the stinger 26. The stinger 26 is attached to and extends from the stern of the lay barge 20. The stinger 26 provides support for the pipeline 36 as it leaves the lay barge 20.

Figure 2:
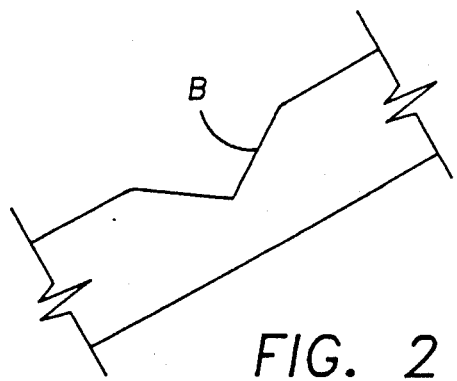
FIG. 2 is an enlarged view of the wet buckle in the pipeline in FIG. 1.
Figure 3:
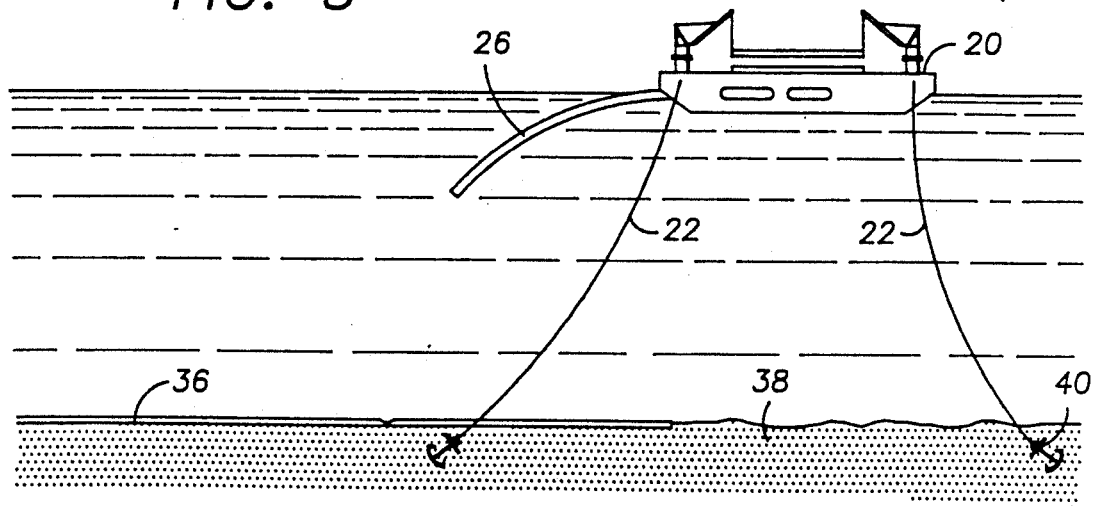
FIG. 3 is an diagrammatic view illustrating a wet buckled pipeline on the sea floor.
Figure 4:
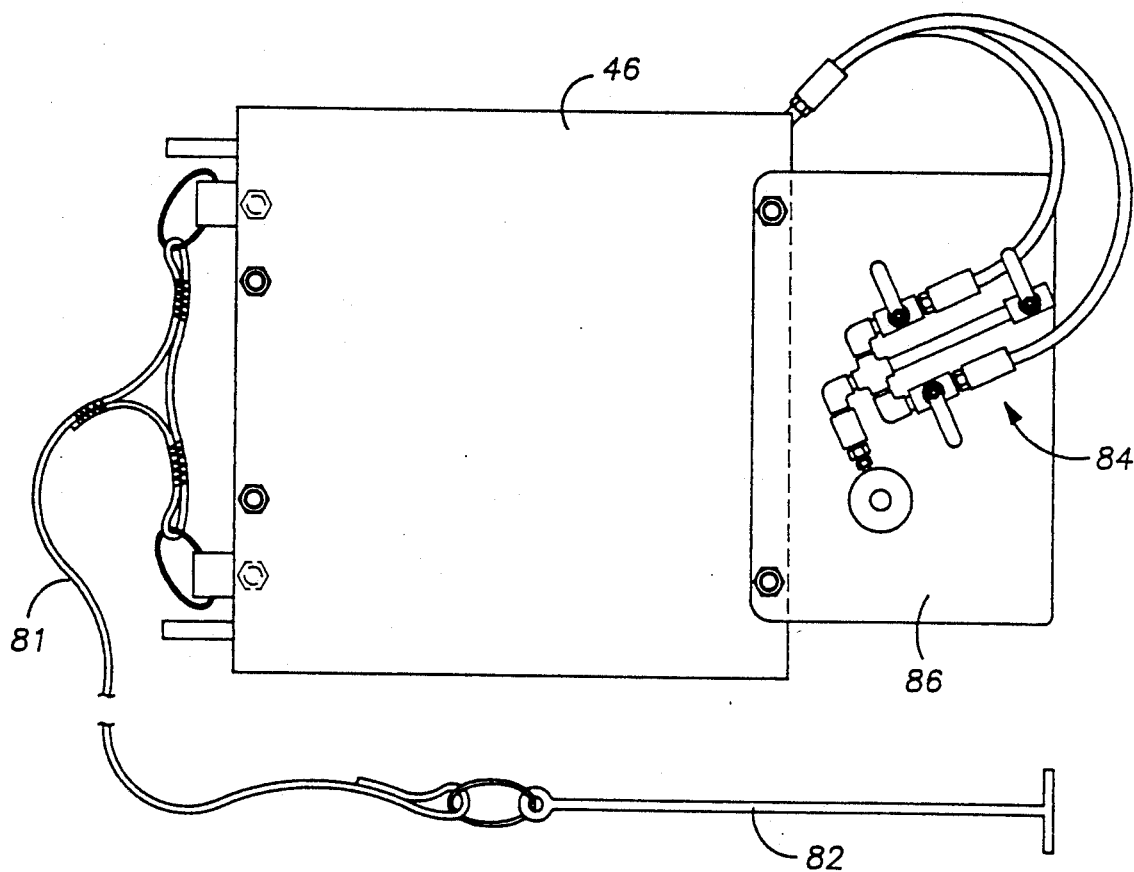
FIG. 4 is a top view of a deflated lift bag assembly.

During pipe lay, the suspended pipe span 28 between the sea floor 38 and the lay barge 20 is in a form resembling a shallow S and is referred to as the S-curve. The S-curve of the pipeline 36 is controlled by the stinger 26 and the pipeline tensioners 24. The more curved the pipeline 36, the larger the bending moment, and therefore the higher the stresses, which can result in buckling of the pipeline 36, as shown in FIGS. 1 and 2. A loss of tension in the pipeline 36 during the pipe lay will normally cause the pipeline 36 to buckle at a point along the suspended pipe span 28. A buckle B, as shown in FIG. 2, is called a wet buckle if the pipeline 36 has cracked and water is allowed to enter the pipeline 36. The influx of water into the pipeline 36 greatly increases the weight of the suspended pipe span 28 such that the pipe becomes over stressed at a location along the suspended pipe span 28, generally near the stinger 26, and the pipe breaks. Thus, the suspended pipe span 28 falls to rest on the sea floor 38, resulting in a damaged, water-filled pipeline 36 lying on the sea floor 38, as shown in FIG. 3. The pipeline 36 can also be damaged by ship anchors, fishing operations, or geologic shifts in the sea floor at a time subsequent to the construction of the pipeline 36, which will also require retrieval of the pipeline 36 in order to repair the pipeline 36. The method of the present invention is equally applicable to either of the above damaged pipeline scenarios.

It is significant to note that the following sequence of steps involved in retrieving the submerged pipeline 36 may be accomplished with a support vessel 42 rather than the lay barge 20, except as otherwise noted below. This is an important factor from an economic standpoint, due to the fact that the support vessel 42 is significantly less expensive than the lay barge 20. The cost of the vessel, whether lay barge 20 or support vessel 42, is one of the primary costs in the retrieval operation. Thus, being able to utilize a support vessel for the majority of the retrieval operation significantly reduces the entire cost of retrieving the pipeline 36.

The support vessel 42 is moored or dynamically positioned above the damaged section of the pipeline 36. As a preliminary step in the recovery operation, the location of the damage to the pipeline 36 must be determined. External inspection techniques using a remotely operated vehicle (ROV) 100 can be used. The ROV 100 is equipped with a camera and lights (not shown) which allow the operators on the support vessel 42 to view the sea floor 38 and the damaged pipeline 36. The site survey includes determining the bearing capacity of the sea floor 38 at the location desired to cut the damaged pipe. The bearing capacity may be determined by deploying a clump weight (not shown) of known weight and cross-sectional area with markings designating units of length on a vertical face of the clump weight. The clump weight is lowered by a surface winch mounted on the deck of the support vessel 42 until the clump weight rests on the sea floor 38. The camera on the ROV 100 is used to view the distance that the clump weight has sunk into the sea floor 38. The bearing capacity of the sea floor 38 is required to determine how far lift bags 46 will sink when they are filled with water to raise the pipeline 36 off the sea floor 38. The clump weight 44 is then retrieved to the support vessel 42 by the winch 43.

The location for placing the lift bags 46 is then dredged using an ROV 100 mounted dredge (not shown). The purpose of dredging is to form a trench 48 under the pipeline 36 large enough to slide the lift bags 46 beneath the pipeline 36. A number of alternatives are available for forming the trench 48 beneath the pipeline. Dredging is the preferred means for forming the trench 48 due to the dredge sucking in the sea floor material at the selected location and discharging the dredged material at the rear of the ROV 100. This procedure minimizes the amount of sea floor disturbance which affects the visibility while being viewed by the operators on the support vessel 42. A jetting process can also be used to form the trench 48; however, this significantly stirs up the sea floor and reduces the visibility. The size and depth of the trench 48 required is slightly greater than the dimensions of the deflated lift bags 46. The dredge is hydraulically powered by the ROV 100.

Figure 5:
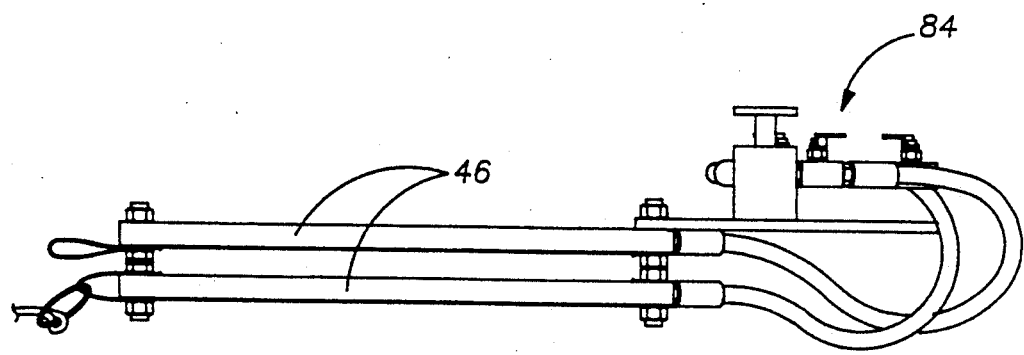
FIG. 5 is an elevation view of the deflated lift bag assembly shown in FIG. 4.
Figure 6:
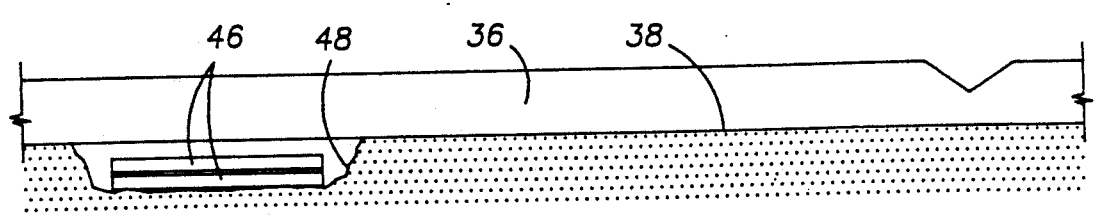
FIG. 6 is an elevation view of the deflated lift bag assembly positioned in a trench below the pipeline.

Lift bags 46 are deployed from the support vessel 42 by the surface winch 43. The ROV 100 positions the lift bags 46 beneath the pipeline 36. Each lift bag 46 is neatly and compactly stored such that it is approximately 3 feet square and 1 inch thick in the preferred embodiment. As shown in FIG. 5, two lift bags 46 are connected one on top of another so that the combined height of the deflated lift bags 46 is approximately 2 inches. Thus, the trench 48 need only be in the range of 6 inches in depth and slightly greater than 3 feet wide in order to place the deflated lift bags 46 in the trench 48 beneath the pipeline 36. Positioning the deflated lift bags 46 beneath the pipeline 36 with the ROV 100 is simplified by attaching a rope 81 and pull rod 82 to the lift bags 46. The rod 82 is shoved beneath the pipeline 36 in the trench 48 by the ROV 100 from one side of the pipeline 36 and then the ROV 100 is repositioned on the other side of the pipeline 36 and pulls the rod 82 and the rope 81 until the deflated lift bags 46 are positioned in the trench 48.

After the lift bags 46 have been placed, the ROV 100 makes a stab connection between a water pump (not shown) mounted on the ROV 100 and a valve and piping assembly 84 mounted on a plate 86 which is attached to the lift bag 46. The water pump (not shown) is hydraulically powered from the ROV 100 and uses the local sea water for inflating the lift bags 46. The valve and piping assembly 84, operable by the ROV 100, permits selective filling or releasing of water from either one or both of the lift bags 46. The lift bags 46 are inflated with water until the pipeline 36 is raised to a satisfactory height. It is desirable to raise the pipeline approximately 1 to 2 pipe diameters off the sea floor 38, depending on the diameter of the pipeline 36. Each lift bag 46 is capable of inflating to a height of approximately 20 inches. Thus, the double lift bag arrangement is capable of raising a pipe approximately 40 inches off of the sea floor 38. The lift bags 46 provide a maximum of approximately 75 tons of lift. A typical lift bag could be a power lift bag Model VSK-74/131-02-074 or equivalent distributed by Vetters Systems, Inc. of Warrendale, Pa.

Figure 7:
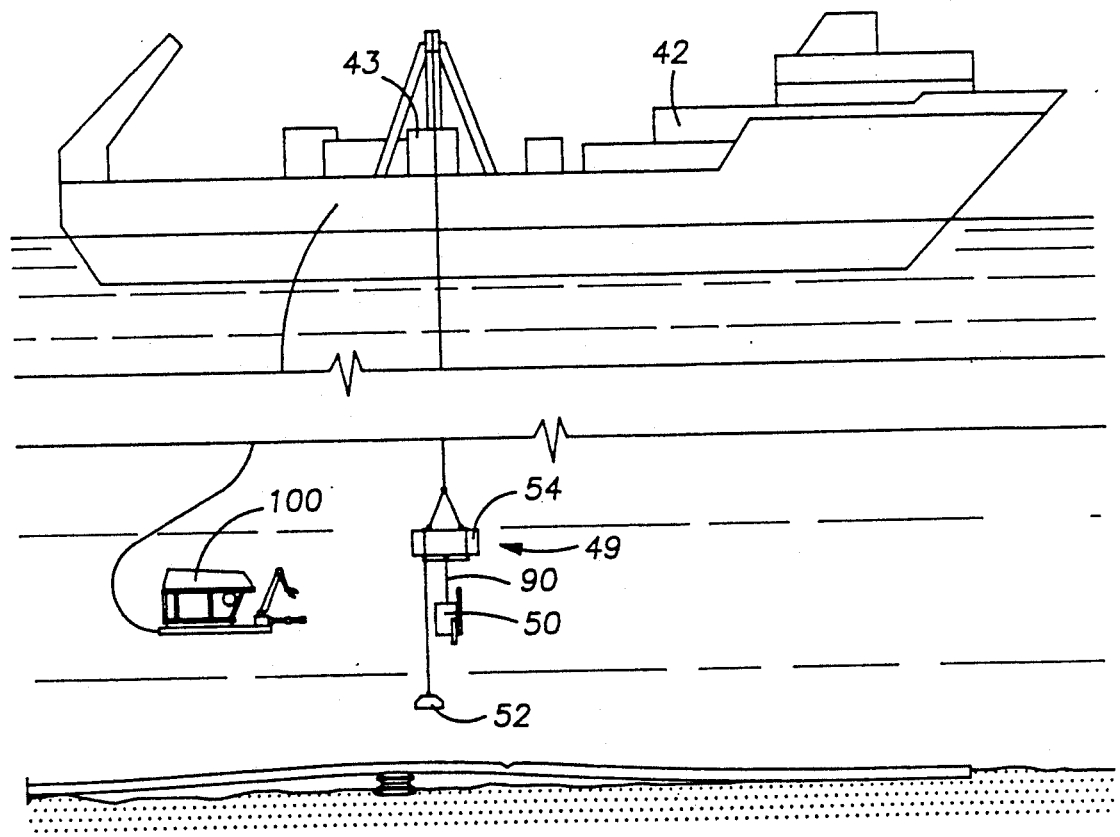
FIG. 7 is a diagrammatic view illustrating the deployment of a cutoff saw to the pipeline.

As shown in FIG. 7, a cutoff saw 50 is deployed from the support vessel 42 in a three-piece launch assembly 49 which includes a clump weight 52, the cutoff saw 50, and a buoyancy module 54. The clump weight 52 is suspended from the lower side of the buoyancy module 54 by a clump weight cable 88. The cutoff saw 50 is also suspended from the lower side of the buoyancy module 54 by a cutoff saw cable 90. The clump weight cable 88 is longer than the cutoff saw cable 90 so that the clump weight 52 is first to reach the sea floor 38. The three piece launch assembly 49 is lowered by the surface winch 43. As the three-piece launch assembly 49 reaches the sea floor 38, the ROV 100 assists in setting the clump weight 52 on the sea floor 38 near the inflated lift bags 46. The ballast of the buoyancy module 54 is trimmed until the cutoff saw 50 and buoyancy module 54 are approximately neutral. The ROV 100 stabs in a hydraulic connection on the cutoff saw 50 and flies the cutoff saw 50 to the pipe at the location where the pipeline 36 is to be cut.

Figure 8:
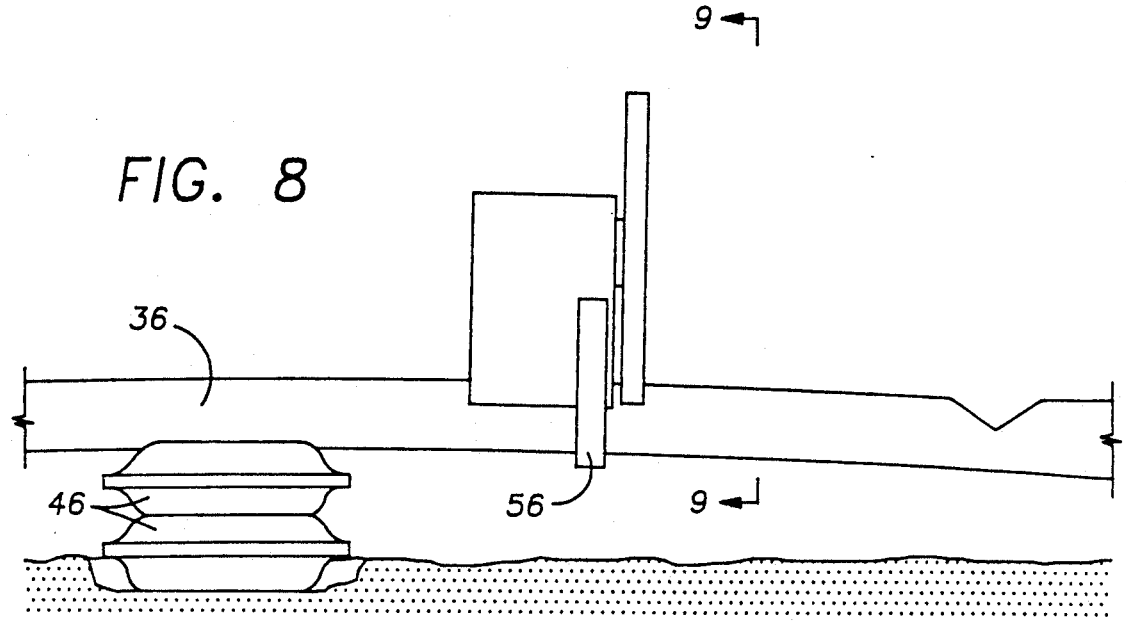
FIG. 8 is an elevation view of the inflated lift bags and the cutoff saw positioned on the elevated section of pipeline.
Figure 9:
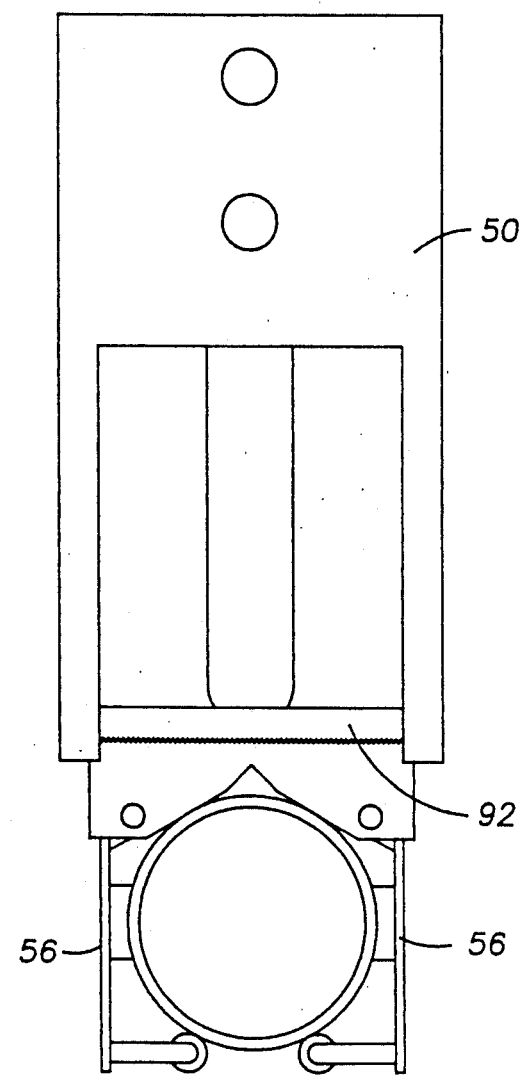
FIG. 9 is a view of the cutoff saw taken along lines 9—9 of FIG. 8.

Referring to FIGS. 8 and 9, the cutoff saw 50 includes clamps 56 for attaching and aligning the cutoff saw 50 to the pipeline 36. The clamps 56 are hydraulically assisted (not shown) by the ROV 100. The cutoff saw 50 has a reciprocating blade 92 which saws through the pipeline 36 beginning at the top of the pipe. The blade 92 is reciprocated by hydraulic means (not shown). It is intended to make one cut through the pipeline 36 with the cutoff saw 50. The cut should be a clean, undeformed cut for the later insertion of a recovery head 60 (FIG. 14) into the severed end 58 of the pipeline 36. By raising the pipeline 36 with the lift bags 46, the raised pipeline 36 is subjected to a bending stress with the lower fibers of the pipeline 36 in compression and the upper fibers in tension. The cutoff saw 50 is oriented to cut into the top fibers of the pipe 36 which are in tension. As the pipeline 36 is being cut, the unsupported section of pipe sags, keeping the uppermost uncut fibers in tension. Alternatively, explosive shaped charges can be used to sever the pipeline 36. However, the cutoff saw 50 may still be required to make a clean, undeformed cut for the later insertion of the recovery head 60. The cutoff saw 50 is then retrieved to the support vessel 42.

Figure 10:
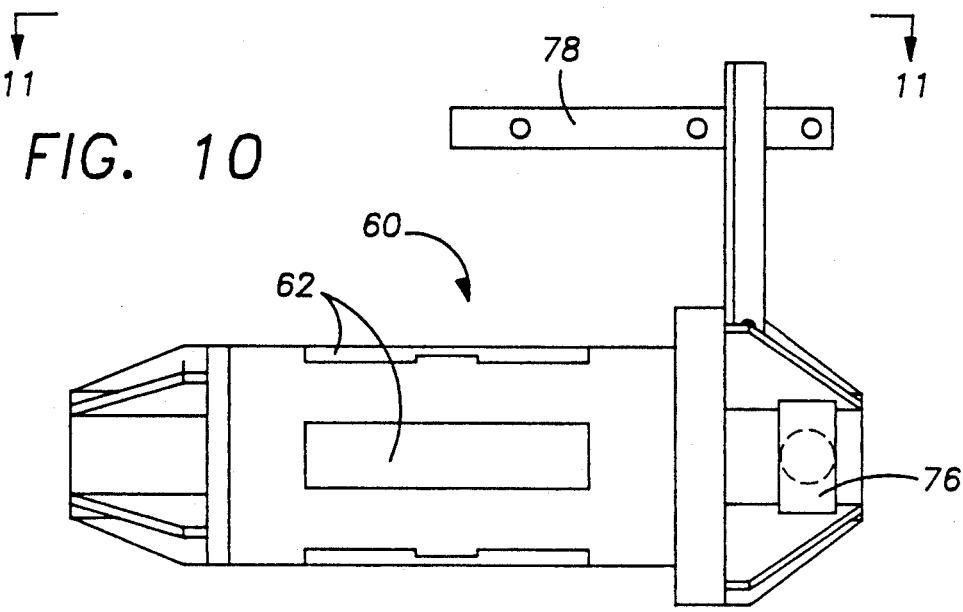
FIG. 10 is an elevation view of the recovery head.
Figure 11:
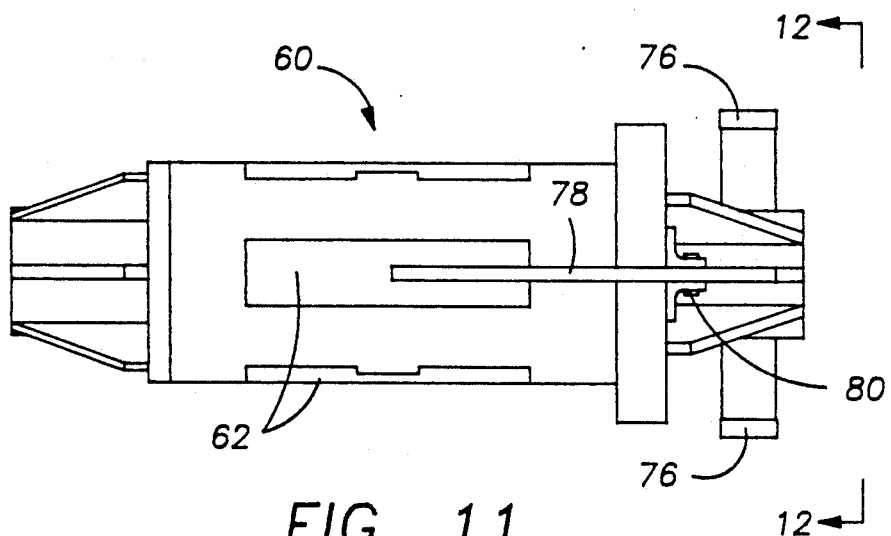
FIG. 11 is a view of the recovery head taken along lines 11—11 of FIG. 10.
Figure 12:
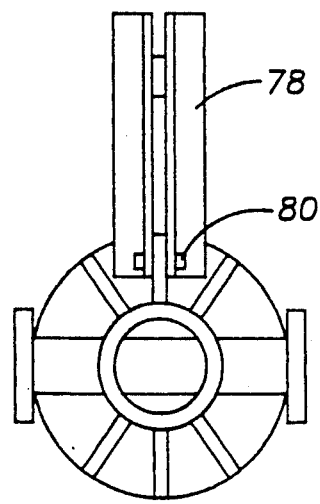
FIG. 12 is a view of the recovery head taken along lines 12—12 of FIG. 11.
Figure 13:
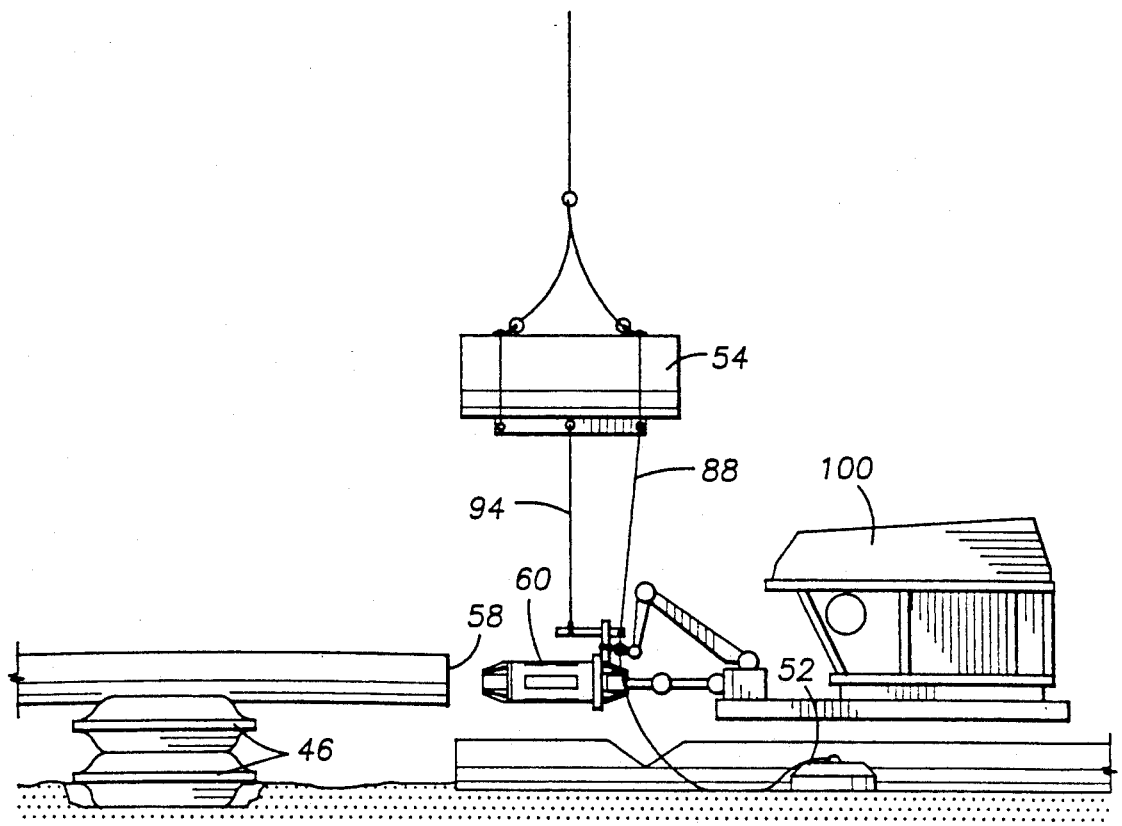
FIG. 13 is an elevation view illustrating the deployment and insertion of a recovery head in a severed end of the pipeline.

Referring to FIG. 13, the recovery head 60 (FIGS. 10, 11, 12) is next launched in a three-piece launch assembly 49 which includes a clump weight 52, the recovery head 60, and a buoyancy module 54. The clump weight 52 is again suspended from the lower side of the buoyancy module 54 by the clump weight cable 88. The recovery head 60 is suspended from the lower side of the buoyancy module 54 by a recovery head cable 94. The length of the clump weight cable 88 is greater than the length of the recovery head cable 94, so that the clump weight 52 is the first to reach the sea floor 38. The clump weight 52 is lowered to the sea floor 38 and the ballast of the buoyancy module 54 is trimmed so that the recovery head 60 and buoyancy module 54 are nearly neutral. The ROV 100 mates with the recovery head 60 and flies the recovery head 60 into the clean cut pipe end 58. The recovery head 60 includes slips 62 which are locked into the inside diameter of the pipe by an external torque wrench (not shown) manipulated by the ROV 100. The buoyancy module 54 is recovered back to the surface, counterbalanced by the clump weight 52.

Before the end 58 of the pipeline 36 is raised to the water surface, the pipeline 36 is preferably dewatered or voided of any fluids by a pipeline pig (not shown) to reduce the weight of the pipeline 36 being raised to the water surface. Reducing the weight of the pipeline 36 section to be raised will minimize the possibility of the pipeline 36 buckling during the raising process. Various pigging operations to void the pipeline 36 are well known in the art. The operation for pigging the pipeline depends on the as-laid configuration of the first end (not shown) of the pipeline. A pig launcher (not shown) is connected to that end with a pig enclosed. Once connected, a gas source is attached and gas under pressure greater than the local hydrostatic pressure plus the pig driving pressure is pumped into the first end of the pipeline 36. As the pipeline pig travels toward the pipeline's severed end 58, it voids the entire pipeline 36 of fluids. When the pipeline pig reaches the end of the pipeline 36 and stops against the recovery head 60, the gas source is disconnected and an isolation valve is closed to maintain the air pressure in the de-watered pipeline 36.

Figure 15:
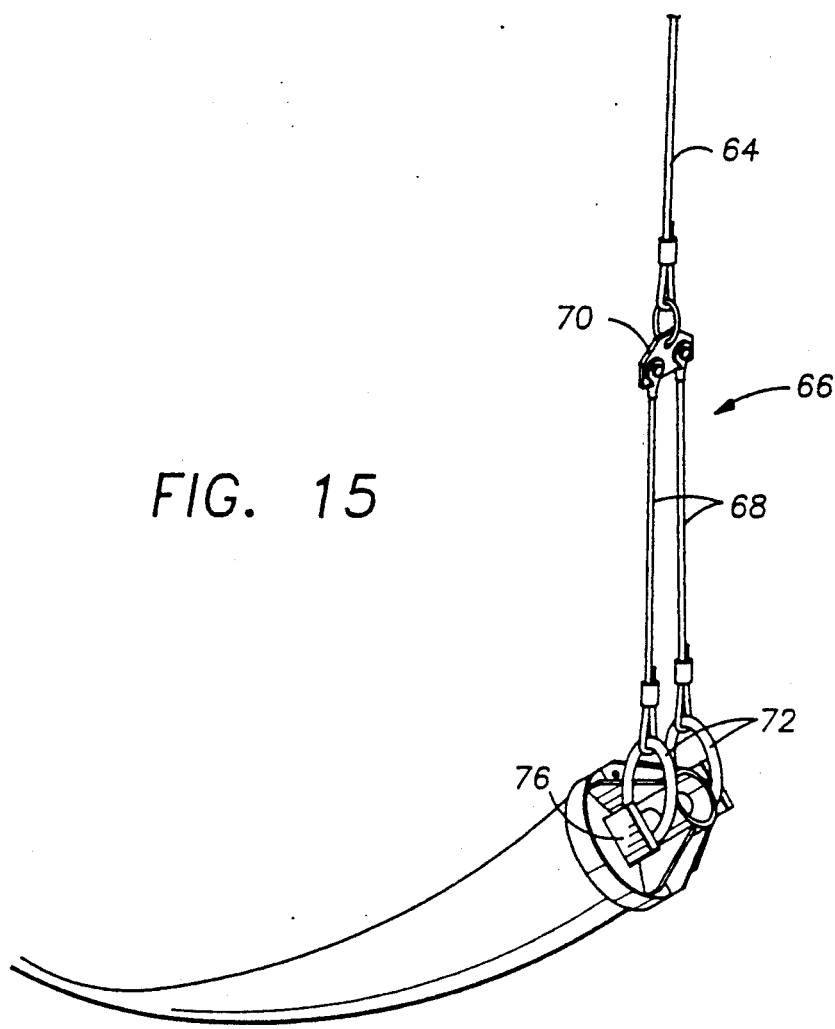
FIG. 15 is a perspective view of the fish plate sling assembly and the recovery head as the pipeline is being raised off the sea floor.
Figure 16:
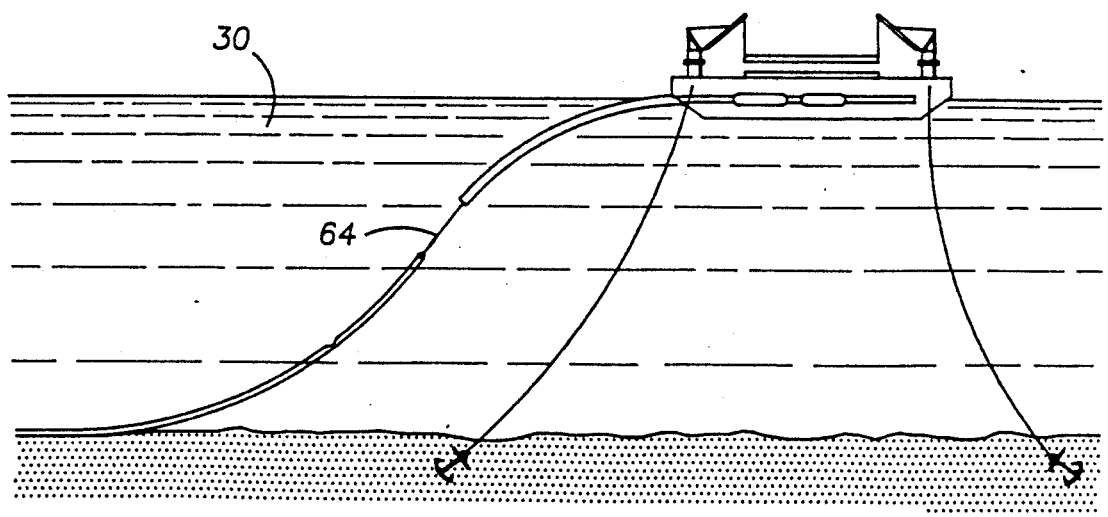
FIG. 16 is a diagrammatic view illustrating the recovery of the retrieved cable and raising of the pipeline toward the water surface.

The remaining recovery operations at the severed end 58 of the pipeline 36 require the use of a lay barge 20. The ROV 100 is deployed from the surface. A recovery cable 64 (FIG. 15) includes a fish plate sling assembly 66 connected to the end of the recovery cable 64. The fish plate sling assembly 66 includes a pair of slings 68 connected at one end to a fish plate 70 and terminating at the other end with master links 72. Each master link 72 has a buoyancy block (not shown) attached to support each master link 72. The master link 72 makes the cable connection via a pair of T-posts 76 attached to the recovery head 60. The ROV 100 has been equipped with a utility winch (not shown) which is utilized to pull the fish plate 70 and the recovery cable 64 to the recovery head 60. The ROV 100 then inserts the master links 72, one at a time, over the T-posts 76 on the recovery head 60. Buoyancy blocks (not shown) are cut free and a reaction bar 78 of the recovery head 60 is removed by removing a reaction bar pin 80.

Figure 14:
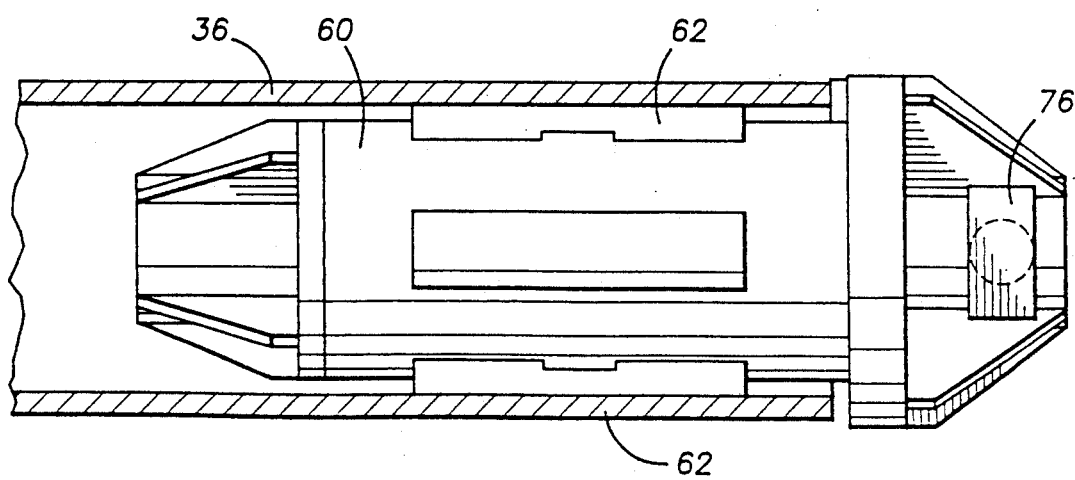
FIG. 14 is a view of the activated recovery head in the severed end of the pipeline.

As the recovery cable 64 and fish plate sling assembly 66 are tensioned, the ROV 100 monitors the initial lift off of the pipe line 36 from the sea floor 38, insuring that the master links 72 are properly seated on the recovery head 60. The recovery cable 64 is reeled in on the lay barge 20, retrieving the pipe end 58 to the stinger 26 and onto the pipe ramp and into the grasp of the pipeline tensioners 24 of the lay barge 20. It is important to note that the recovery head 60, with the reaction bar 78 and pin 80 having been removed at the sea floor 38, is not significantly greater in diameter than the pipeline 36 (FIG. 14). Thus, the recovery head 60 does not obstruct or interfere with any steps involved in the actual retrieval and securing of the pipeline 36 on the lay barge 20. Once the pipeline 36 is held by the pipeline tensioners 24, the internal air pressure of the pipeline 36 is relieved before releasing the recovery head 60. Similar steps can be used to recover the damaged pipe section which is still on the sea floor 38. Various alternatives are available in retrieving a damaged section of pipe which was damaged during the pipe lay operation. The remaining section can be raised with the recovery head 60 in a single piece by retrieving it up the stinger 26 and performing the cutting steps on the lay barge 20. Similarly, the recovery head 60 could also be used to retrieve the damaged pipe section vertically through the draw works of a drilling rig (not shown) and cutting the pipe into sections as it is lifted to the surface.

It should be understood that the invention consists of a method for retrieving a submerged pipeline and the invention should not be unduly limited to the foregoing set forth for illustrative purposes. Various modifications and alterations of the invention will be apparent to those skilled in the art without departing from the true scope of the invention.

We claim:

1. A method for severing a submerged pipeline setting on the sea floor, comprising the steps of:
    lowering a deflated lift bag from the water surface to a substantially straight segment of said pipeline;
    positioning said deflated lift bag under the substantially straight segment of said pipeline;
    inflating said deflated lift bag with liquid and raising a section of said pipeline off said sea floor;
    lowering a cutoff saw from the water surface to said raised section of said pipeline;
    clamping said cutoff saw to said raised section of said pipeline; and
    severing said pipeline by means of said cutoff saw.

2. The method for severing a submerged pipeline set forth in claim 1, including:
    forming trench in said sea floor below the substantially straight segment of said pipeline prior to positioning said deflated lift bag.

3. The method for severing a submerged pipeline set forth in claim 1, wherein said lowering of said cutoff saw is accomplished by using a surface mounted winch and cable on a boat.

4. The method for severing a submerged pipeline set forth in claim 3, wherein said lowering of said cutoff saw comprises:
    lowering a buoyancy module having said cutoff saw suspended by a cutoff saw cable from said buoyancy module and a clump weight suspended by a clump weight cable from said buoyancy module, said clump weight being suspended lower than said cutoff saw so that said clump weight is first to contact said sea floor;
    setting said clump weight on said sea floor in the proximate area of said raised section of said pipeline;
    deballasting said buoyancy module so that the combined said cutoff saw and said buoyancy module achieve substantially neutral buoyancy; and
    positioning said cutoff saw on said raised section of said pipeline.

5. The method for severing a submerged pipeline set forth in claim 1, wherein said inflating of said deflated lift bag is accomplished by utilizing a hydraulically-powered water pump proximately located near said deflated lift bag.

6. The method for severing a submerged pipeline set forth in claim 1, wherein said clamping of said cutoff saw is accomplished with a hydraulically assisted clamp which is engaged at the sea floor.

7. A method for severing a submerged pipeline setting on the sea floor, comprising the steps of:
    lowering a deflated lift bag from the water surface to a substantially straight segment of said pipeline;
    forming a trench in said sea floor below the substantially straight segment of said pipeline;
    positioning said deflated lift bag under the substantially straight segment of said pipeline;

inflating said deflated lift bag with liquid and raising a section of said pipeline off said sea floor;

lowering a cutoff saw from the water surface to said raised section of said pipeline, said lowering of said cutoff saw comprises:

lowering a buoyancy module having said cutoff saw suspended by a cutoff saw cable from said buoyancy module and a clump weight suspended by a clump weight cable from said buoyancy module, said clump weight being suspended lower than said cutoff saw so that said clump weight is first to contact said sea floor;

setting said clump weight on said sea floor in the proximate area of said raised section of said pipeline;

deballasting said buoyancy module so that the combined said cutoff saw and said buoyancy module achieve substantially neutral buoyancy; and positioning said cutoff saw on said raised section of said pipeline;

clamping said cutoff saw to said raised section of said pipeline;

severing said pipeline by means of said cutoff saw.

8. The method for severing a submerged pipeline set forth in claim 7, wherein said inflating of said deflated lift bag is accomplished by utilizing a hydraulically-powered water pump proximately located near said deflated lift bag.

9. The method for severing a submerged pipeline set forth in claim 7, wherein said clamping of said cutoff saw is accomplished with a hydraulically assisted clamp which is engaged at the sea floor.

10. A method for recovering a submerged pipeline, comprising the steps of:

lowering a deflated lift bag from the water surface to a substantially straight segment of said pipeline;

positioning said deflated lift bag under the substantially straight segment of said pipeline;

inflating said deflated lift bag with liquid and raising a section of said pipeline off said sea floor;

cleanly severing said pipeline at said raised section;

lowering a recovery head from the water surface to said raised end of said severed pipeline;

aligning said recovery head with said raised end of said severed pipeline;

placing said recovery head in said raised end of said severed pipeline;

gripping said raised end of severed pipeline by activating said recovery head until said recovery head is in gripping relationship with said pipeline;

lowering a recovery cable from the water surface to said recovery head;

connecting said recovery cable with said recovery head; and retrieving said recovery cable to raise said recovery head and said pipeline towards the water surface.

11. The method for recovering a submerged pipeline set forth in claim 10, including:

forming a trench in said sea floor below the substantially straight segment of said pipeline prior to positioning said deflated lift bag.

12. The method for recovering a submerged pipeline set forth in claim 10, wherein said inflating of said deflated lift bag is accomplished by utilizing a hydraulically-powered water pump proximately located near said deflated lift bag.

13. The method for recovering a submerged pipeline set forth in claim 10, wherein said cleanly severing said pipeline at said raised section comprises:

lowering a cutoff saw from the water surface to said raised section of said pipeline;

clamping said cutoff saw to said raised section of said pipeline; and severing said pipeline by means of said cutoff saw.

14. The method for recovering a submerged pipeline set forth in claim 13, wherein said lowering of said cutoff saw comprises:

lowering a buoyancy module having said cutoff saw suspended by a cutoff saw cable from said buoyancy module and a clump weight suspended by a clump weight cable from said buoyancy module, said clump weight being suspended lower than said cutoff saw so that said clump weight is first to contact said sea floor;

setting said clump weight on said sea floor in the proximate area of said raised section of said pipeline;

deballasting said buoyancy module so that the combined said cutoff saw and said buoyancy module achieve substantially neutral buoyancy; and positioning said cutoff saw on said raised section of said pipeline.

15. The method for recovering a submerged pipeline set forth in claim 13, wherein said clamping of said cutoff saw is accomplished with a hydraulically assisted clamp which is engaged at the sea floor.

16. The method for recovering a submerged pipeline set forth in claim 10, wherein said lowering of said recovery head comprises:

lowering a buoyancy module having said recovery head suspended by a recovery head cable from said buoyancy module and a clump weight suspended by a clump weight cable from said buoyancy module, said clump weight being suspended lower than said recovery head so that said clump weight is first to contact said sea floor;

setting said clump weight on said sea floor in the proximate area of said raised section of said pipeline; and deballasting said buoyancy module so that the combined said recovery head and said buoyancy module achieve substantially neutral buoyancy.

17. The method for recovering a submerged pipeline set forth in claim 10, further comprising:

attaching a pair of slings to an end of a recovery cable prior to lowering said recovery cable, each of said slings having a master link at the free end.

18. The method for recovering a submerged pipeline set forth in claim 17, further comprising:

attaching a buoyancy block to each of said master links.

19. The method for recovering a submerged pipeline set forth in claim 17, wherein said connecting said recovery cable with said recovery head comprises:

placing each said master link over a T-post on said recovery head.

* * * * *